US012398863B1

(12) United States Patent
Zou

(10) Patent No.: US 12,398,863 B1
(45) Date of Patent: Aug. 26, 2025

(54) STRING LAMP AND STRING LAMP STRUCTURE

(71) Applicant: Sijun Zou, Meizhou (CN)

(72) Inventor: Sijun Zou, Meizhou (CN)

( * ) Notice: Subject to any disclaimer, the term of this patent is extended or adjusted under 35 U.S.C. 154(b) by 0 days.

(21) Appl. No.: 18/788,350

(22) Filed: Jul. 30, 2024

(51) Int. Cl.

| | |
|---|---|
| ***F21V 17/04*** | (2006.01) |
| ***F21S 4/10*** | (2016.01) |
| ***F21V 1/14*** | (2006.01) |
| ***F21V 17/12*** | (2006.01) |
| ***F21V 19/00*** | (2006.01) |
| ***F21V 23/00*** | (2015.01) |

(52) U.S. Cl.
CPC ................ *F21V 17/04* (2013.01); *F21S 4/10* (2016.01); *F21V 1/146* (2013.01); *F21V 17/12* (2013.01); *F21V 19/008* (2013.01); *F21V 23/002* (2013.01)

(58) Field of Classification Search
CPC ................................. F21V 17/04; F21V 17/12
See application file for complete search history.

(56) References Cited

U.S. PATENT DOCUMENTS 5,359,506 A * 10/1994 Koleno .................... F21S 4/10 362/255
5,749,648 A * 5/1998 Lin ......................... F21V 31/00 362/808
6,238,062 B1 * 5/2001 Hsu ........................... F21S 4/10 362/267
6,250,779 B1 * 6/2001 Martinez ................... F21S 4/10 362/248
2021/0156530 A1 * 5/2021 Huang ...................... F21V 1/12
2023/0296239 A1 * 9/2023 Zou ....................... F21V 31/005 362/249.16
2024/0360964 A1 * 10/2024 He ...................... F21V 19/0025
2025/0052410 A1 * 2/2025 Yang ....................... F21V 23/06

FOREIGN PATENT DOCUMENTS

DE 102009030282 A1 * 12/2009 ................ F21S 4/10

* cited by examiner

*Primary Examiner* — Zheng Song

(57) ABSTRACT

Disclosed are a string lamp and a string lamp structure. The string lamp includes a lamp holder, a lamp tube and a lampshade; the lamp holder includes an inner shell portion for connecting the lamp tube and an outer shell portion for connecting the lampshade; a first region between the inner shell portion and the outer shell portion is provided with a connection structure covering the first region along a circumferential direction of the inner shell portion; and the connection structure, the inner shell portion and the outer shell portion are integrally formed. The first region is provided with the connection structure, and the connection structure, the inner shell portion and the outer shell portion are integrally formed, thereby reducing the difficulty of a manufacturing process, and also enhancing the stability of the overall structure of the string lamp.

17 Claims, 15 Drawing Sheets

A-A

STRING LAMP AND STRING LAMP STRUCTURE

CROSS REFERENCE TO RELATED APPLICATION

This application claims priority benefit of Chinese patent Application No. 202421689256.3, filed on Jul. 16, 2024, and the entire contents of which are incorporated herein by reference.

TECHNICAL FIELD

The present application relates to the technical field of lamps, and in particular, to a string lamp and a string lamp structure.

BACKGROUND

String lamps are widely used in daily life. Inside the string lamp, the lamp tube and lampshade are usually arranged independently or only connected by means of a rib plate, which makes the manufacturing process difficult.

SUMMARY

In view of this, it is necessary to provide a string lamp and a string lamp structure to solve at least one of the above problems.

The first aspect of the present application provides a string lamp. The string lamp includes a lamp holder, a lamp tube and a lampshade; the lamp holder includes an inner shell portion for connecting the lamp tube and an outer shell portion for connecting the lampshade; a first region between the inner shell portion and the outer shell portion is provided with a connection structure covering the first region along a circumferential direction of the inner shell portion; and the connection structure, the inner shell portion and the outer shell portion are integrally formed.

Optionally, a first threaded hole is provided on a side of the inner shell portion facing the lamp tube, a first thread is provided on a side of the lamp tube facing the first threaded hole, and the lamp tube is connected to the first threaded hole through the first thread.

Optionally, a second threaded hole is provided on a side of the outer shell portion facing the lampshade, the second threaded hole is located on a side of the connection structure facing the lampshade, a second thread is provided on a side of the lampshade facing the second threaded hole, and the lampshade is connected to the second threaded hole through the second thread.

Optionally, a first threaded hole is provided on a side of the inner shell portion facing the lampshade, a second thread is provided on a side of the lampshade facing the first threaded hole, the lampshade is connected to the first threaded hole through the second thread, and the lamp tube is fixed to the lampshade.

Optionally, a first positive electrode portion and a first negative electrode portion are provided on the lamp tube, a first opening is provided on a side of the inner shell portion facing the first positive electrode portion, a second opening is provided on a side of the inner shell portion facing the first negative electrode portion, a first metal member is provided within the first opening, a second metal member is provided within the second opening, the first metal member extends from the first opening to the first positive electrode portion and is electrically connected to the first positive electrode portion, and the second metal member extends from the second opening to the first negative electrode portion and is electrically connected to the first negative electrode portion.

Optionally, a first positive electrode portion and a first negative electrode portion are provided on the lamp tube, a second positive electrode portion and a second negative electrode portion are provided on the lampshade, the first positive electrode portion is electrically connected to the second positive electrode portion, the first negative electrode portion is electrically connected to the second negative electrode portion, a first opening is provided on a side of the inner shell portion facing the second positive electrode portion, a second opening is provided on a side of the inner shell portion facing the second negative electrode portion, a first metal member is provided within the first opening, a second metal member is provided within the second opening, the first metal member extends from the first opening to the second positive electrode portion and is electrically connected to the second positive electrode portion, and the second metal member extends from the second opening to the second negative electrode portion and is electrically connected to the second negative electrode portion.

Optionally, a third opening is provided on a side of the inner shell portion facing the lamp tube, the lamp holder further comprises a top cover, a hook-shaped portion is provided on a side of the top cover facing the third opening, a protruding portion is provided on a side of the third opening facing the hook-shaped portion, and the hook-shaped portion is selectively hooked at the protruding portion.

Optionally, there are two third openings and two hook-shaped portions.

Optionally, the first region is a cavity.

Optionally, the connection structure is an annular plate.

The second aspect of the present application provides a string lamp. The string lamp comprises a lamp holder, a lamp tube and a lampshade, wherein the lamp holder comprises an inner shell portion for connecting the lamp tube and an outer shell portion for connecting the lampshade; a first region is provided between the inner shell portion and the outer shell portion; the first region is filled and closed by a connection structure; and the connection structure, the inner shell portion and the outer shell portion are integrally formed.

Optionally, a first threaded hole is provided on a side of the inner shell portion facing the lamp tube, a first thread is provided on a side of the lamp tube facing the first threaded hole, and the lamp tube is connected to the first threaded hole through the first thread.

Optionally, a second threaded hole is provided on a side of the outer shell portion facing the lampshade, the second threaded hole is located on a side of the connection structure facing the lampshade, a second thread is provided on a side of the lampshade facing the second threaded hole, and the lampshade is connected to the second threaded hole through the second thread.

Optionally, a first threaded hole is provided on a side of the inner shell portion facing the lampshade, a second thread is provided on a side of the lampshade facing the first threaded hole, the lampshade is connected to the first threaded hole through the second thread, and the lamp tube is fixed to the lampshade.

Optionally, a first positive electrode portion and a first negative electrode portion are provided on the lamp tube, a first opening is provided on a side of the inner shell portion facing the first positive electrode portion, a second opening is provided on a side of the inner shell portion facing the first negative electrode portion, a first metal member is provided within the first opening, a second metal member is provided within the second opening, the first metal member extends from the first opening to the first positive electrode portion and is electrically connected to the first positive electrode portion, and the second metal member extends from the second opening to the first negative electrode portion and is electrically connected to the first negative electrode portion.

Optionally, a first positive electrode portion and a first negative electrode portion are provided on the lamp tube, a second positive electrode portion and a second negative electrode portion are provided on the lampshade, the first positive electrode portion is electrically connected to the second positive electrode portion, the first negative electrode portion is electrically connected to the second negative electrode portion, a first opening is provided on a side of the inner shell portion facing the second positive electrode portion, a second opening is provided on a side of the inner shell portion facing the second negative electrode portion, a first metal member is provided within the first opening, a second metal member is provided within the second opening, the first metal member extends from the first opening to the second positive electrode portion and is electrically connected to the second positive electrode portion, and the second metal member extends from the second opening to the second negative electrode portion and is electrically connected to the second negative electrode portion.

Optionally, a third opening is provided on a side of the inner shell portion facing the lamp tube, the lamp holder further comprises a top cover, a hook-shaped portion is provided on a side of the top cover facing the third opening, a protruding portion is provided on a side of the third opening facing the hook-shaped portion, and the hook-shaped portion is selectively hooked at the protruding portion.

Optionally, there are two third openings and two hook-shaped portions.

Optionally, the first region is a cavity.

The third aspect of the present application provides a string lamp structure. The string lamp structure comprises at least one string lamp, wherein the string lamp comprises a lamp holder, a lamp tube and a lampshade; the lamp holder comprises an inner shell portion for connecting the lamp tube and an outer shell portion for connecting the lampshade; a first region between the inner shell portion and the outer shell portion is provided with a connection structure covering the first region along a circumferential direction of the inner shell portion; the connection structure, the inner shell portion and the outer shell portion are integrally formed; and the lamp holder is provided with a power line passage for a string lamp power line to pass through.

The present application has the following beneficial effects.

1. A first region between the inner shell portion and the outer shell portion of the lamp holder is provided with a connection structure; and the connection structure, the inner shell portion and the outer shell portion are integrally formed, thereby reducing the difficulty of a manufacturing process, being convenient and quick to mount, having low manufacturing costs, and improving the production efficiency.

2. The connection structure covers the first region along a circumferential direction of the inner shell portion or the first region is filled and closed by a connection structure, thereby enhancing the stability of the connection between the inner shell portion and the outer shell portion and the stability of the overall structure of the string lamp.

BRIEF DESCRIPTION OF THE DRAWINGS

The present application is further explained below by means of the accompanying drawings. However, embodiments in the accompanying drawings do not constitute any limitation on the present application.

Figure 1:
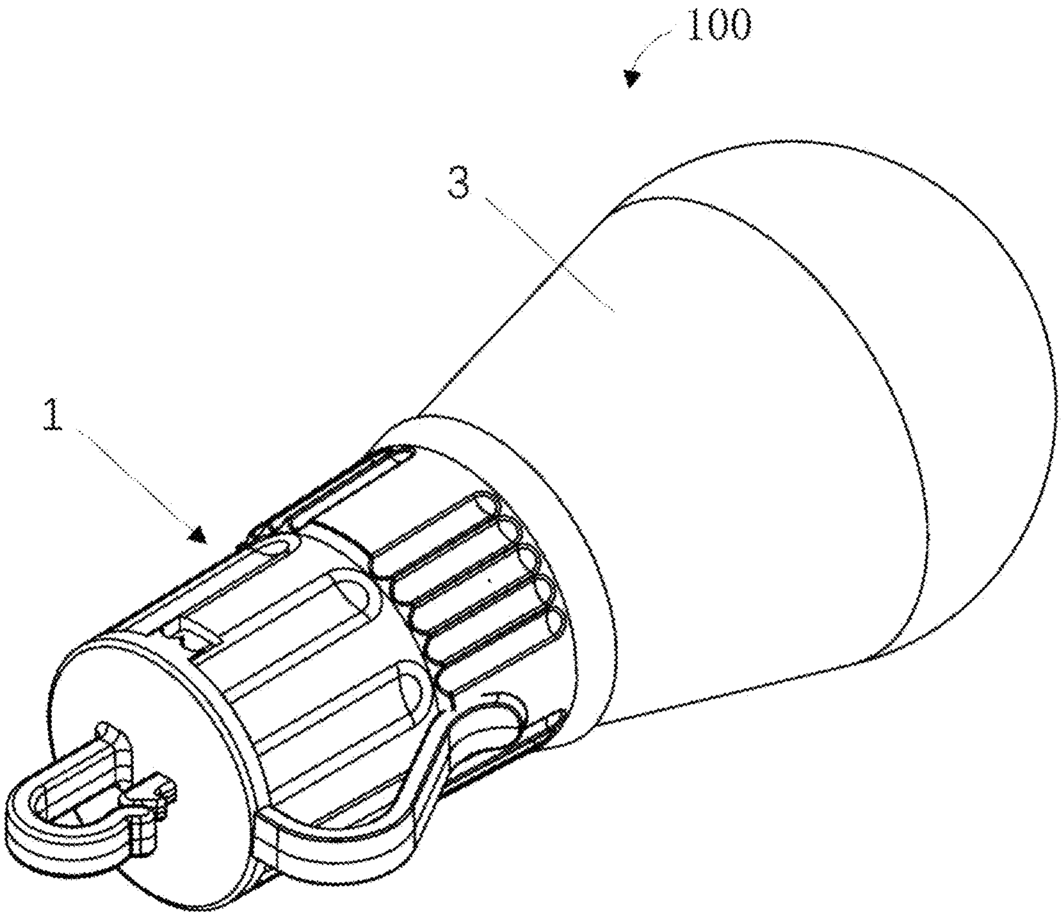
FIG. 1 is a structure diagram of a first embodiment of the present application.

Reference signs in the figures are:

100—string lamp; 1—lamp holder; 2—lamp tube; 3—lamp housing; 4—filament; 5—first opening; 6—second opening; 7—third opening; 8—string lamp power line; 101—inner shell portion; 102—outer shell portion; 103—first region; 104—connection structure; 105—first threaded hole; 106—first thread; 107—second threaded hole; 108—second thread; 109—top cover; 110—hook-shaped portion; 111—protruding portion; 112—power line passage; 201—first positive electrode portion; 202—first negative electrode portion; 301—second positive electrode portion; 302—second negative electrode portion; 501—first metal member; and 601—second metal member.

DETAILED DESCRIPTION

The present application is explained below in conjunction with particular embodiments.

In a first embodiment, as shown in FIGS. 1 to 3*b*, a string lamp 100 includes a lamp holder 1, a lamp tube 2 and a lampshade 3; the lamp holder 1 includes an inner shell portion 101 for connecting the lamp tube 2 and an outer shell portion 102 for connecting the lampshade 3; a first region 103 between the inner shell portion 101 and the outer shell portion 102 is provided with a connection structure 104 covering the first region 103 along a circumferential direction of the inner shell portion 101; and the connection structure 104, the inner shell portion 101 and the outer shell portion 102 are integrally formed.

Optionally, the first region 103 is a cavity, thereby saving material and reducing production costs.

Optionally, the connection structure 104 is an annular plate, thereby improving production yield and usage safety of the product. It should be understood that the connection structure 104 may also be other structures, for example, an annular column, which is not limited herein.

Specifically, a first threaded hole 105 is provided on a side of the inner shell portion 101 facing the lamp tube 2, a first thread 106 is provided on a side of the lamp tube 2 facing the first threaded hole 105, and the lamp tube 2 is connected to the first threaded hole 105 through the first thread 106.

Specifically, a second threaded hole 107 is provided on a side of the outer shell portion 102 facing the lampshade 3, the second threaded hole 107 is located on a side of the connection structure 104 facing the lampshade 3, a second thread 108 is provided on a side of the lampshade 3 facing the second threaded hole 107, and the lampshade is connected to the second threaded hole 107 through the second thread 108.

It can be seen from the described situations that, by means of the described structural design, a first region 103 between the inner shell portion 101 and the outer shell portion 102 of the lamp holder 1 of the string lamp 100 of the first embodiment is provided with a connection structure 104; and the connection structure 104, the inner shell portion 101 and the outer shell portion 102 are integrally formed, thereby reducing the difficulty of a manufacturing process, being convenient and quick to mount, having low manufacturing costs, and improving the production efficiency. In addition, as the connection structure 104 covers the first region 103 along a circumferential direction of the inner shell portion 101, thereby enhancing the stability of the connection between the inner shell portion 101 and the outer shell portion 102 and the stability of the overall structure of the string lamp 100.

In a second embodiment, as shown in FIGS. 1, 4*a* to 5*b*, a string lamp 100 includes a lamp holder 1, a lamp tube 2 and a lampshade 3; the lamp holder 1 includes an inner shell portion 101 for connecting the lamp tube 2 and an outer shell portion 102 for connecting the lampshade 3; a first region 103 between the inner shell portion 101 and the outer shell portion 102 is provided with a connection structure 104 covering the first region 103 along a circumferential direction of the inner shell portion 101; and the connection structure 104, the inner shell portion 101 and the outer shell portion 102 are integrally formed.

The difference between the second embodiment and the first embodiment lies in that the lamp holder 1 of the second embodiment is connected to the lamp tube 2 and the lampshade 3 in the following manner. Specifically, a first threaded hole 105 is provided on a side of the inner shell portion 101 facing the lampshade 3, a second thread 108 is provided on a side of the lampshade 3 facing the first threaded hole 105, the lampshade 3 is connected to the first threaded hole 105 through the second thread 108, and the lamp tube 2 is fixed to the lampshade 3.

It can be seen from the described situations that, by means of the described structural design, the lamp tube 2 is fixed to the lampshade 3, thereby reducing the difficulty of the manufacturing process and facilitating the replacement of the lamp tube 2 and the lampshade 3.

In a third embodiment, as shown in FIGS. 6 to 8*b*, the difference between the third embodiment and the first embodiment lies in that: the lampshade 3 is not included. Specifically, a string lamp 100 includes a lamp holder 1 and a lamp tube 2; the lamp holder 1 includes an inner shell portion 101 for connecting the lamp tube 2 and an outer shell portion 102; a first region 103 between the inner shell portion 101 and the outer shell portion 102 is provided with a connection structure 104 covering the first region 103 along a circumferential direction of the inner shell portion 101; and the connection structure 104, the inner shell portion 101 and the outer shell portion 102 are integrally formed.

It can be seen from the described situations that, by means of the described structural design, as the lampshade 3 does not need to be used, the manufacturing costs of the string lamp 100 are reduced.

Figure 2A:
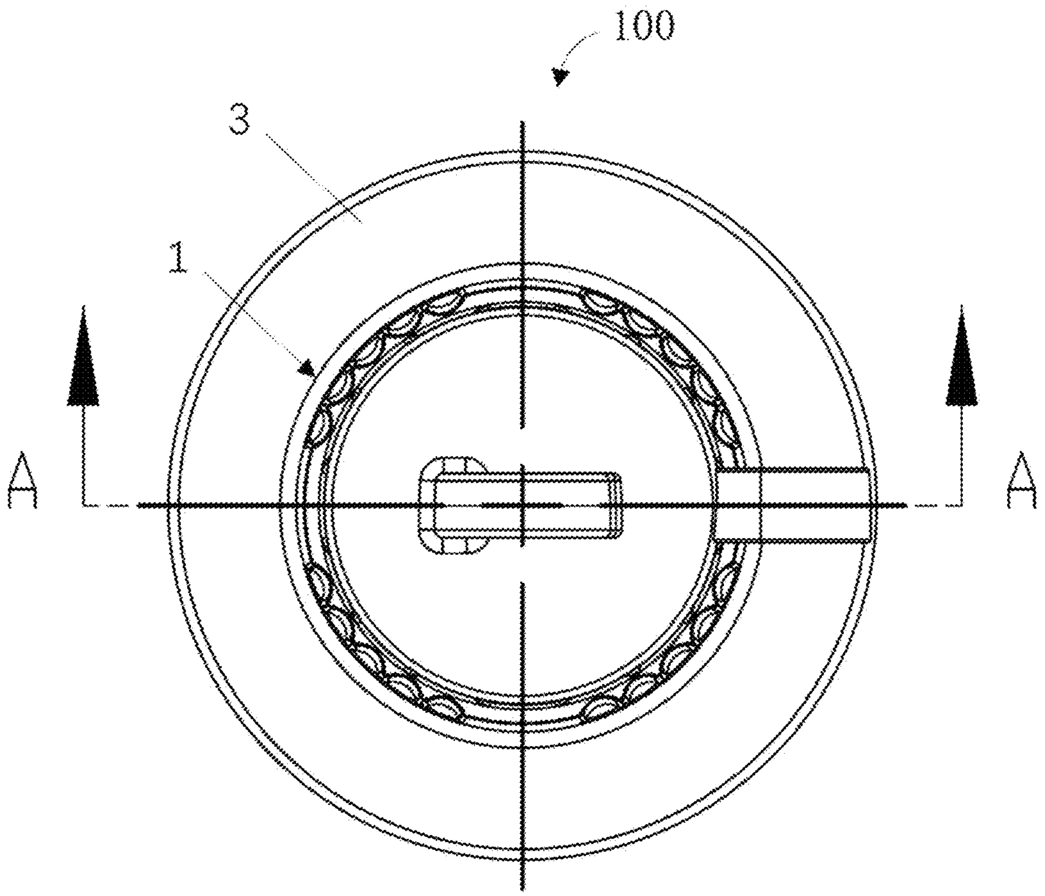
FIG. 2*a* is a sectional structure diagram of a first embodiment of the present application.
Figure 2B:
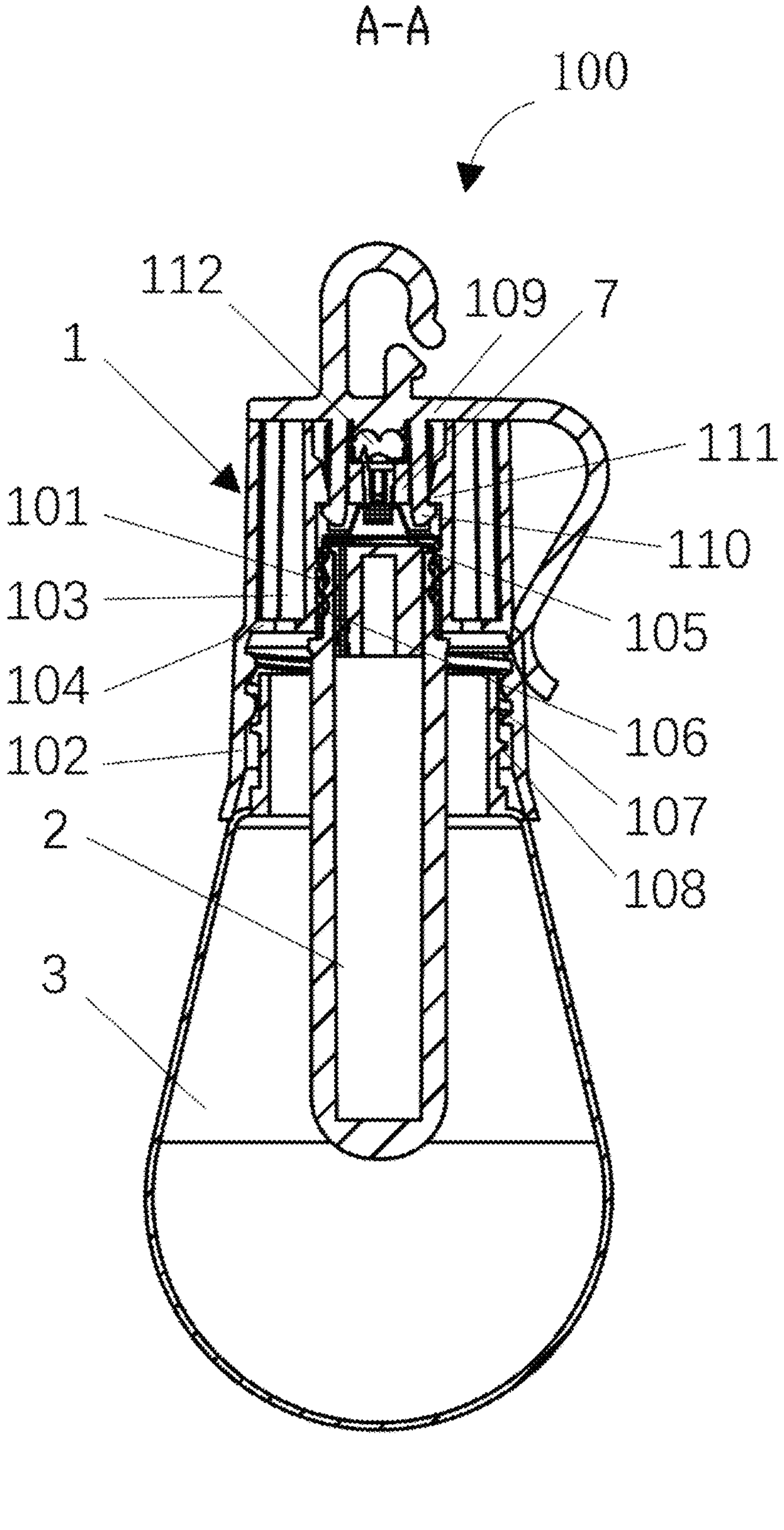
FIG. 2*b* is a sectional structure diagram of a first embodiment of the present application.
Figure 3A:
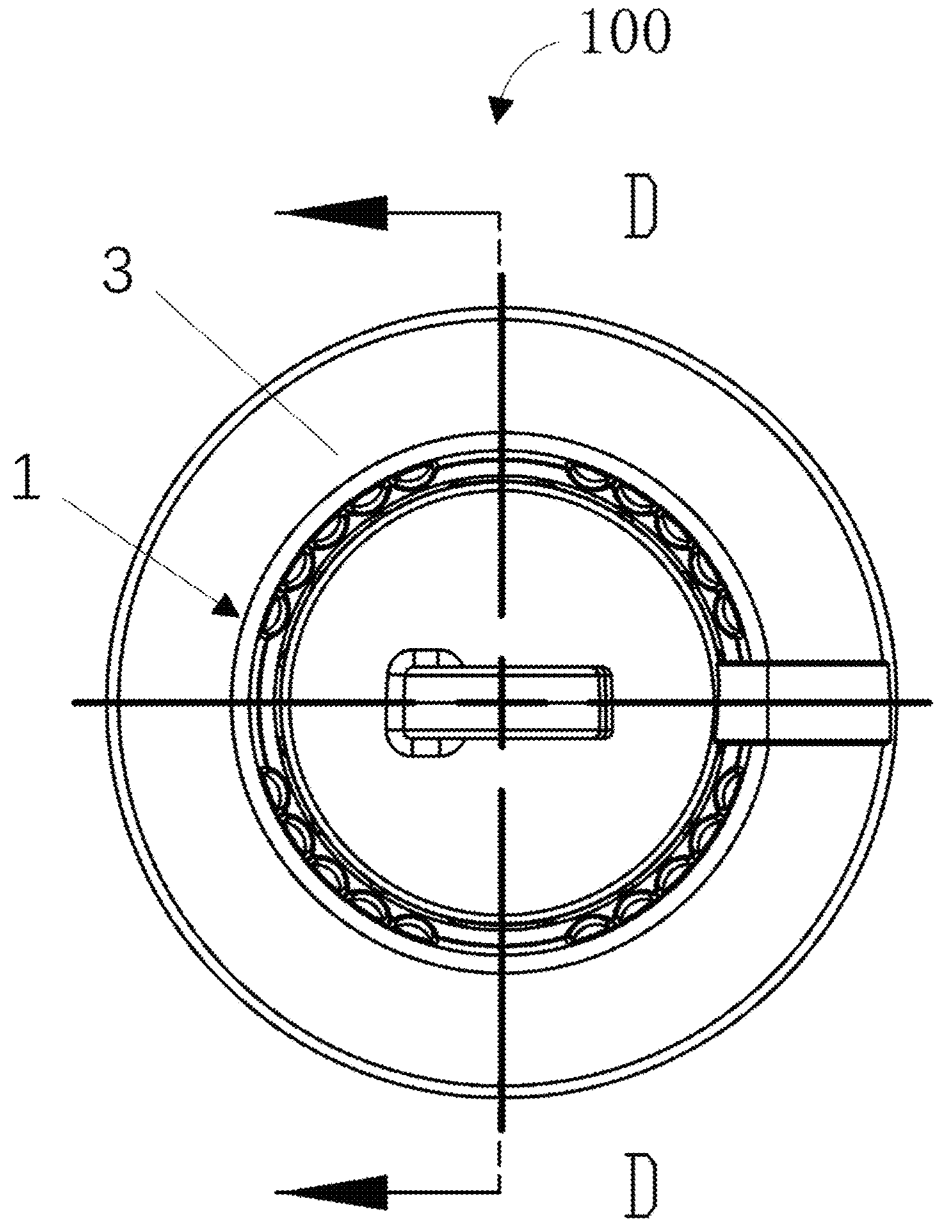
FIG. 3*a* is another sectional structure diagram of a first embodiment of the present application.
Figure 3B:
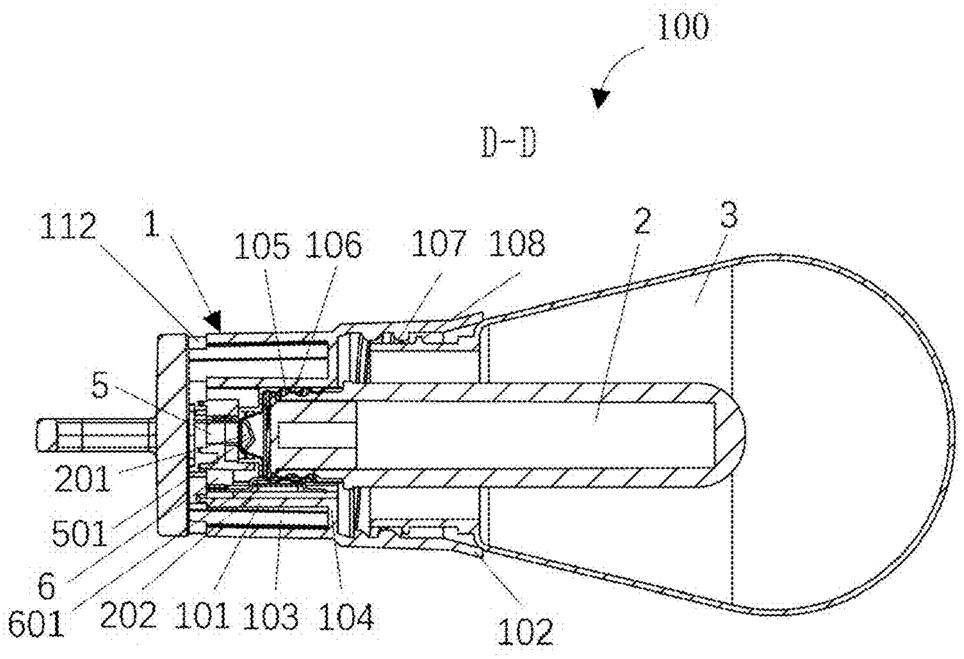
FIG. 3*b* is another sectional structure diagram of a first embodiment of the present application.
Figure 4A:
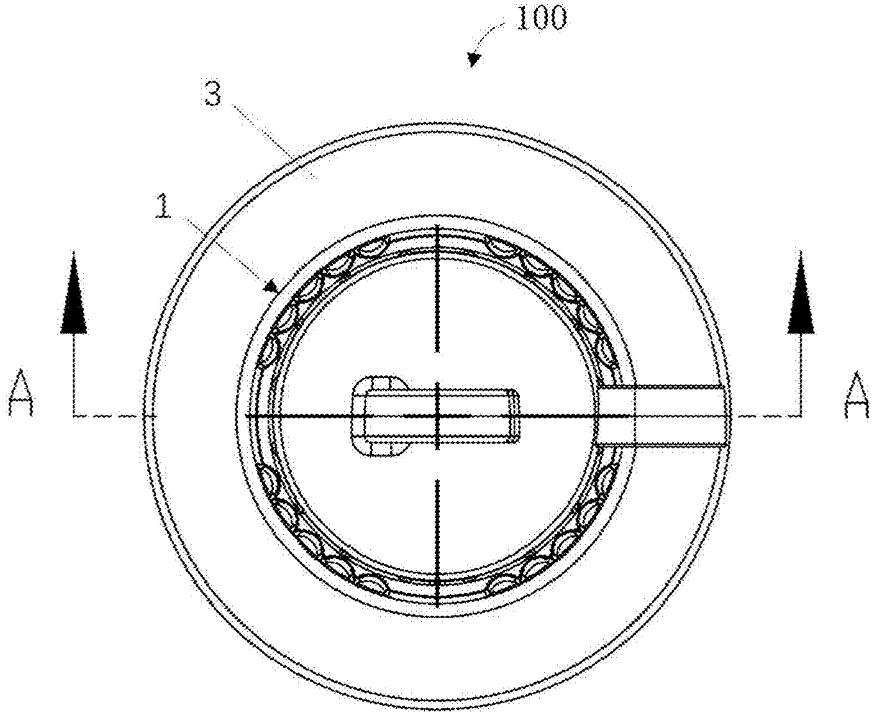
FIG. 4*a* is a sectional structure diagram of a second embodiment of the present application.
Figure 4B:
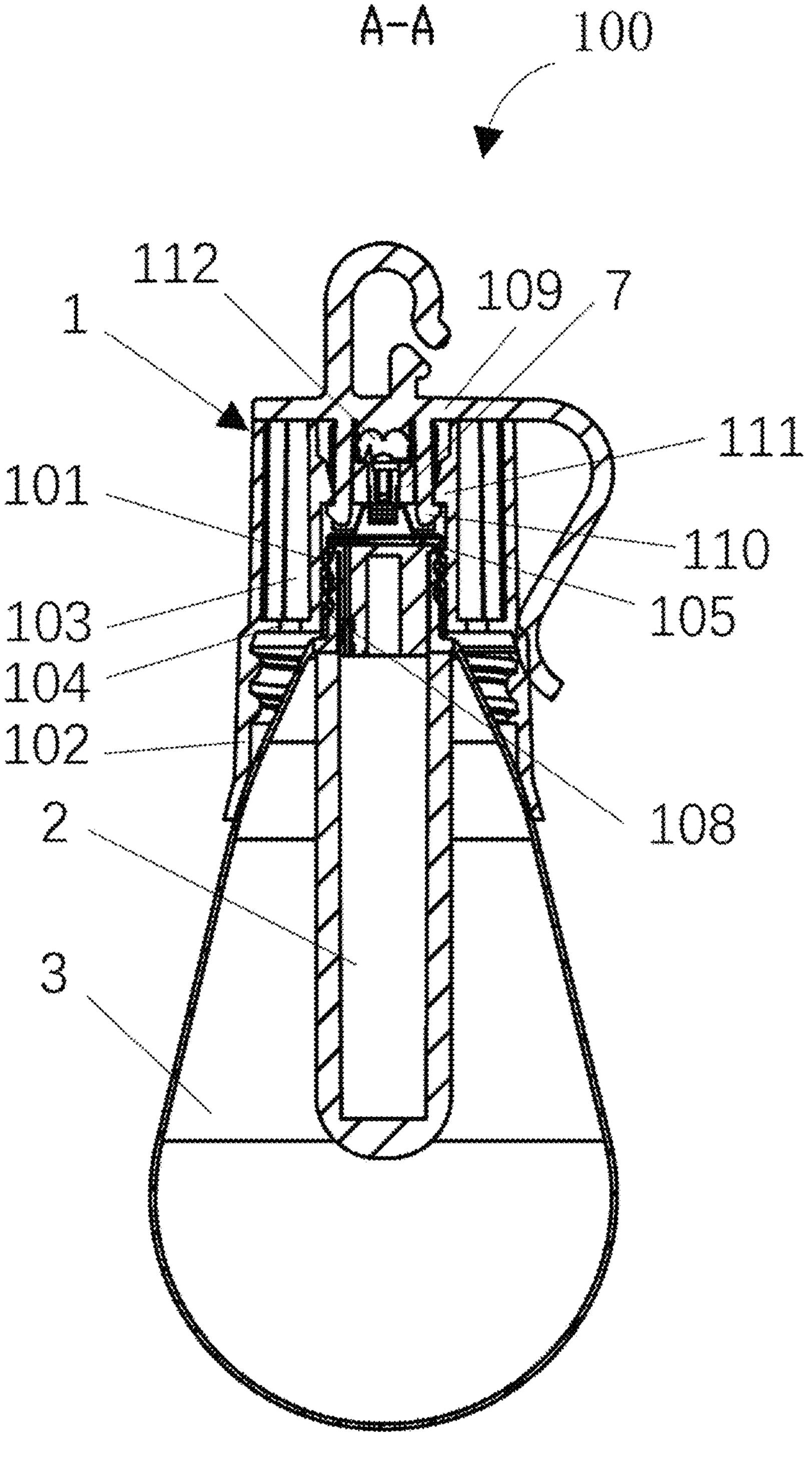
FIG. 4*b* is a sectional structure diagram of a second embodiment of the present application.
Figure 5A:
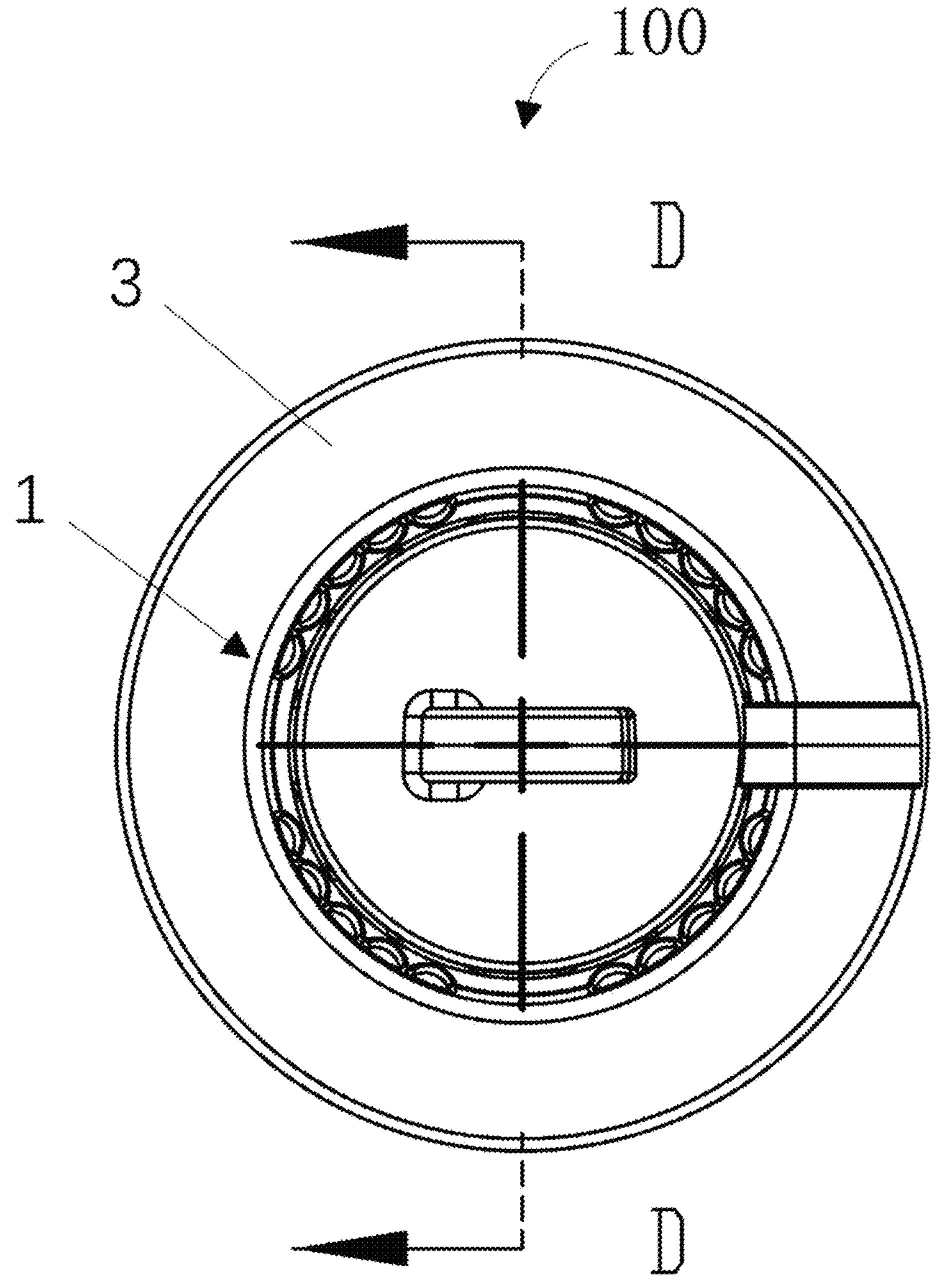
FIG. 5*a* is another sectional structure diagram of a second embodiment of the present application.
Figure 5B:
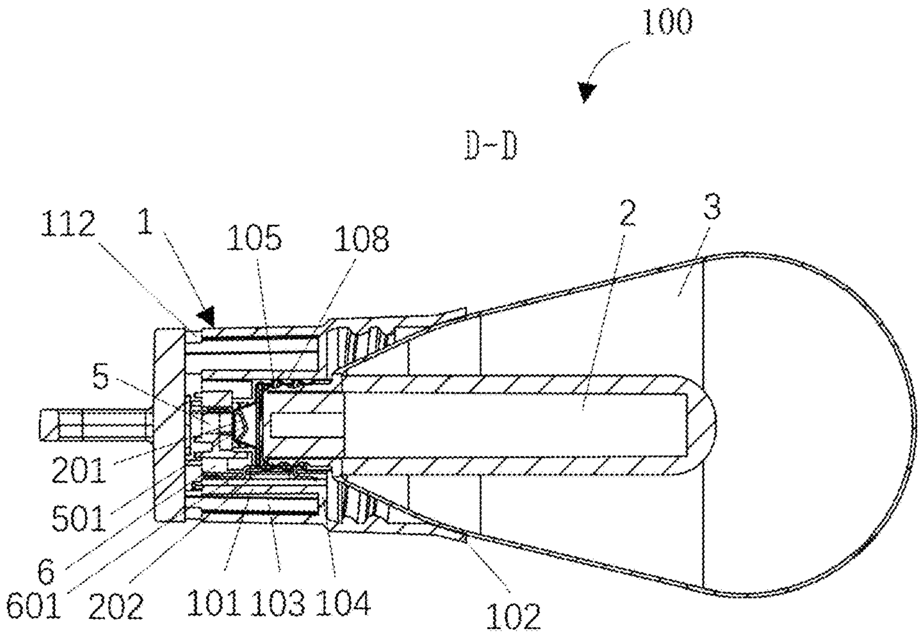
FIG. 5*b* is another sectional structure diagram of a second embodiment of the present application.
Figure 6:
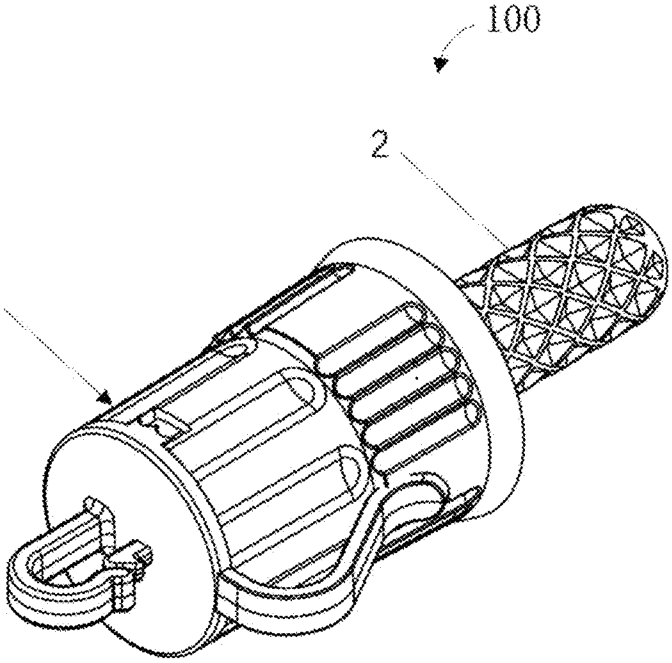
FIG. 6 is a structure diagram of a third embodiment of the present application.
Figure 7A:
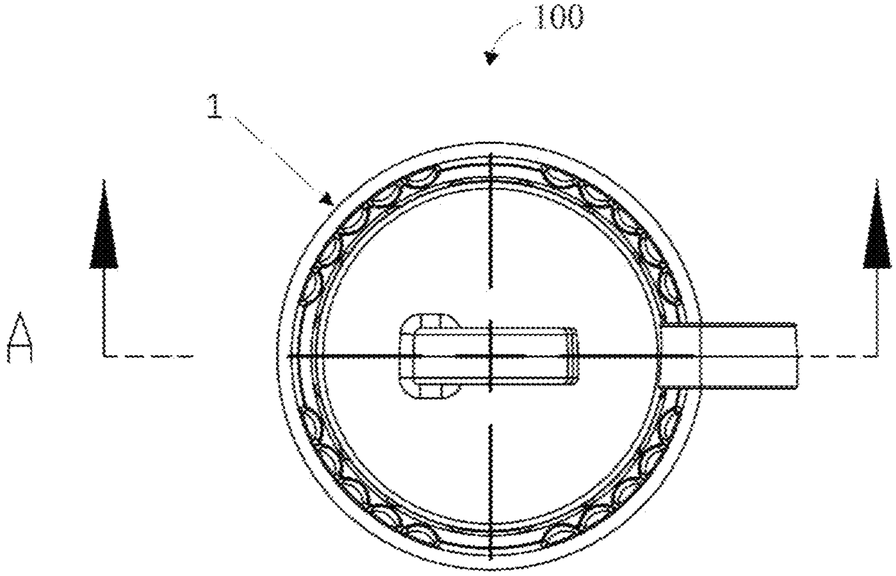
FIG. 7*a* is a sectional structure diagram of a third embodiment of the present application.
Figure 7B:
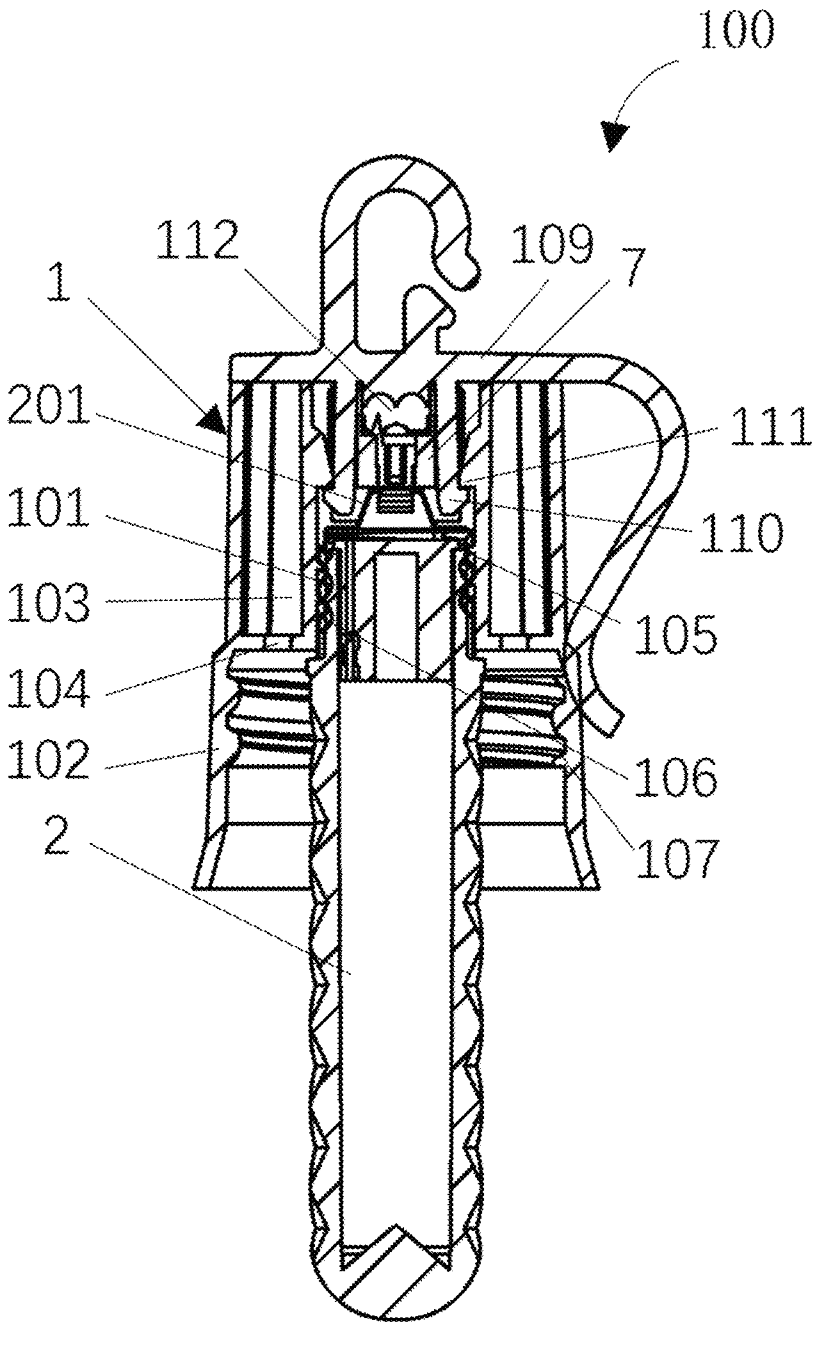
FIG. 7*b* is a sectional structure diagram of a third embodiment of the present application.
Figure 8A:
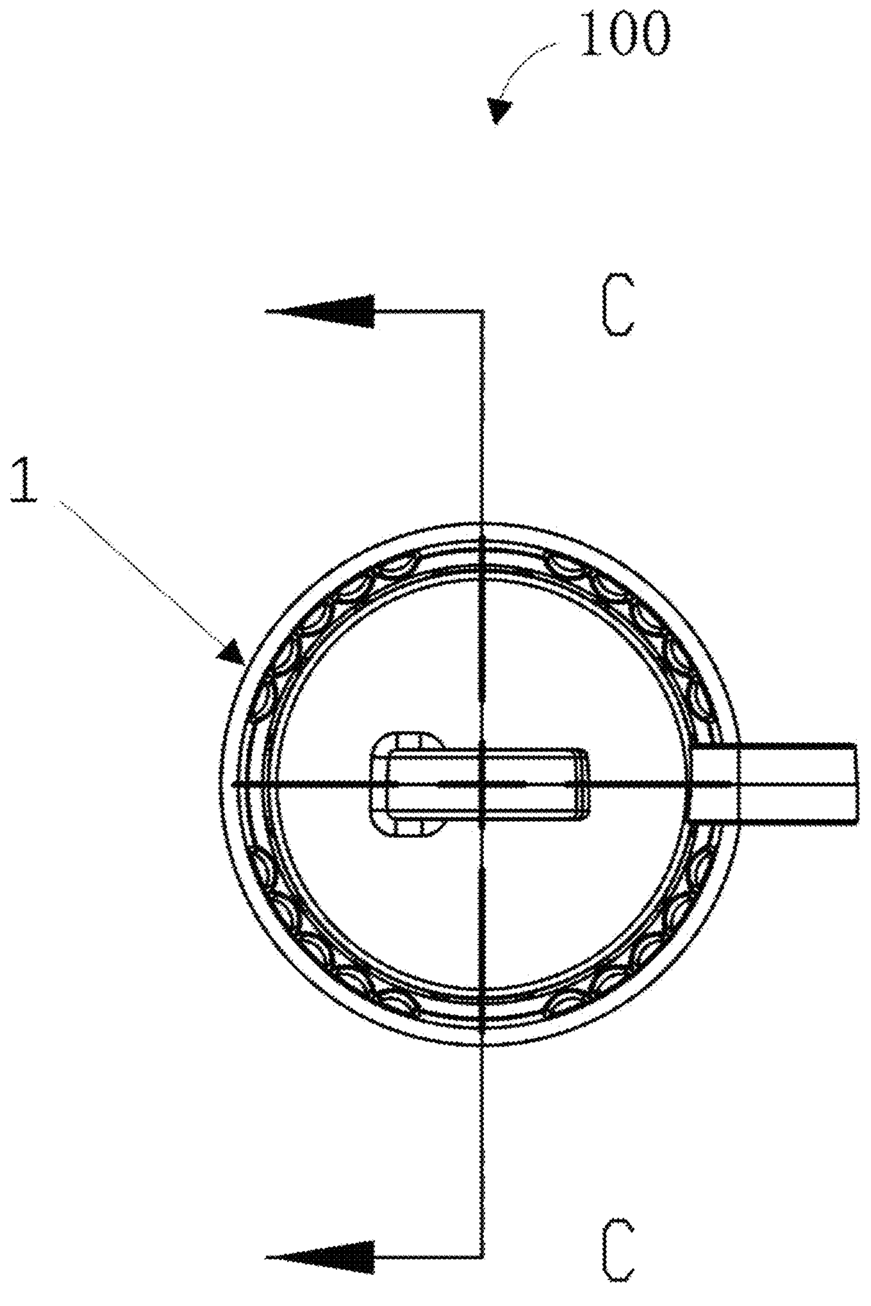
FIG. 8*a* is another sectional structure diagram of a third embodiment of the present application.
Figure 8B:
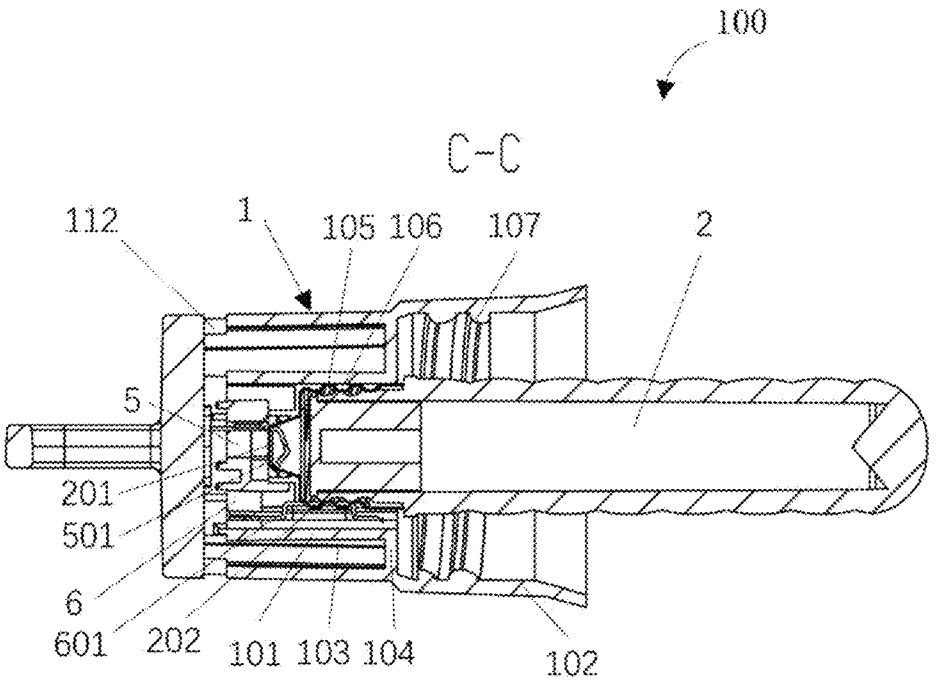
FIG. 8*b* is another sectional structure diagram of a third embodiment of the present application.
Figure 9A:
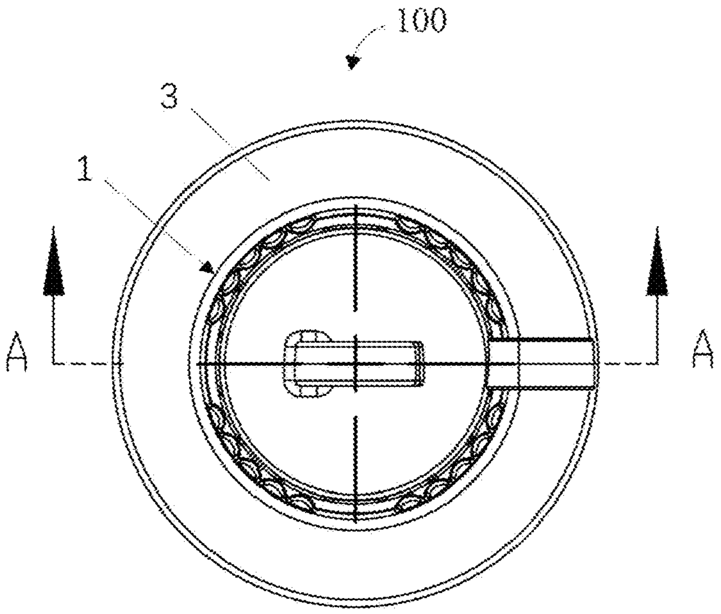
FIG. 9*a* is a sectional structure diagram of a fourth embodiment of the present application.
Figure 9B:
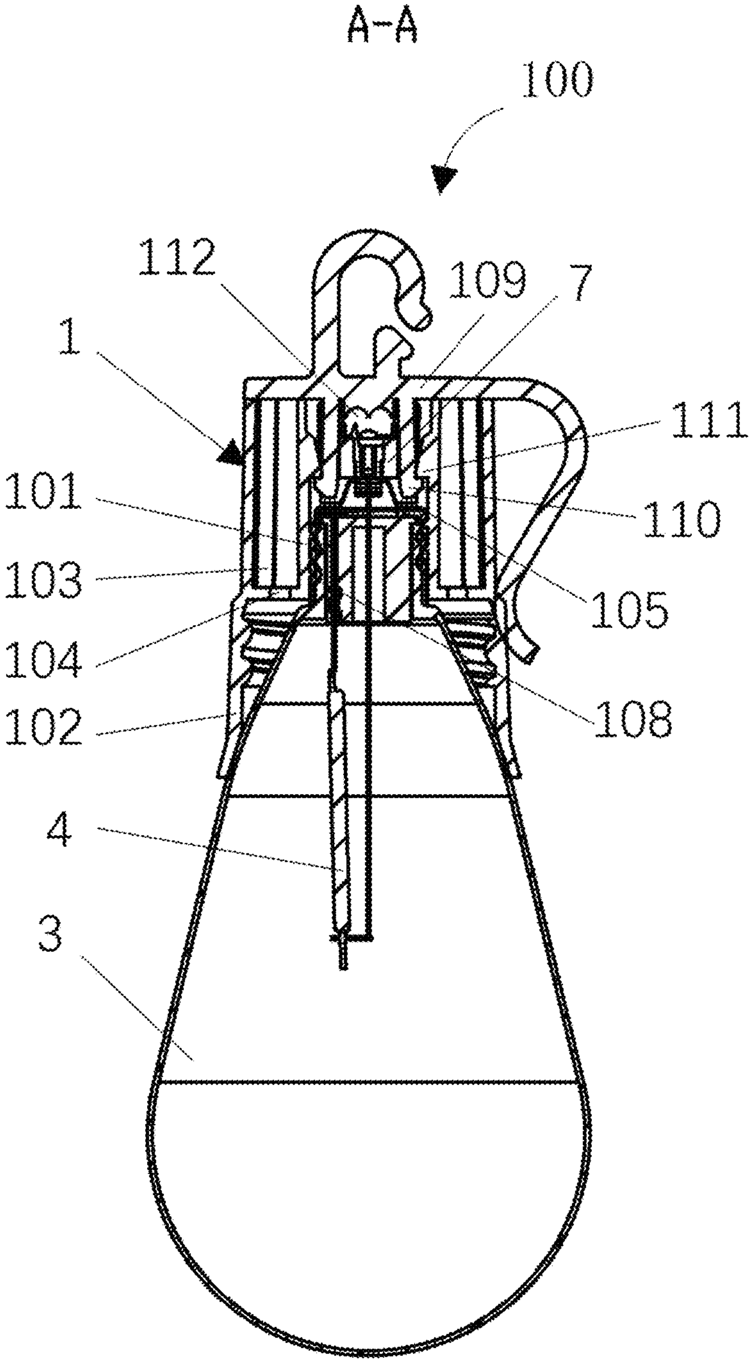
FIG. 9*b* is a sectional structure diagram of a fourth embodiment of the present application.
Figure 10A:
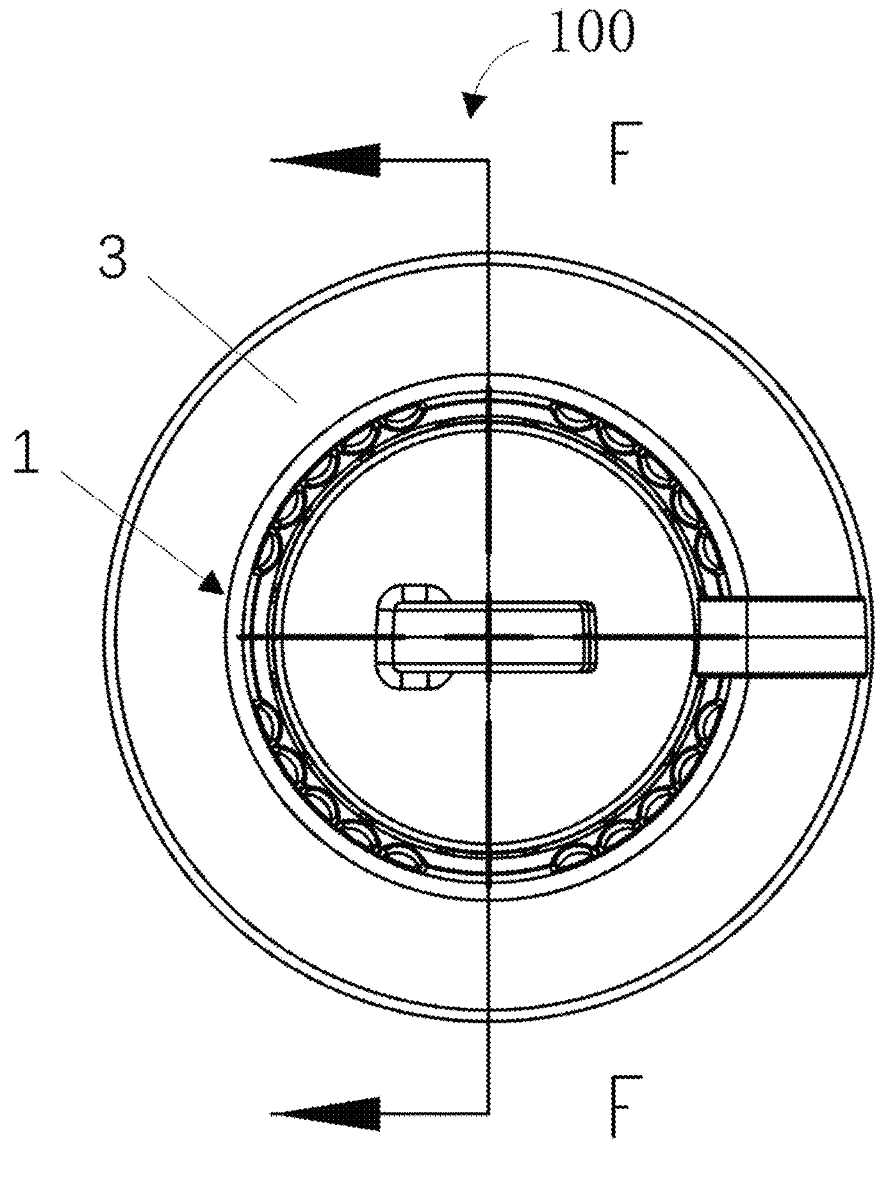
FIG. 10*a* is another sectional structure diagram of a fourth embodiment of the present application.
Figure 10B:
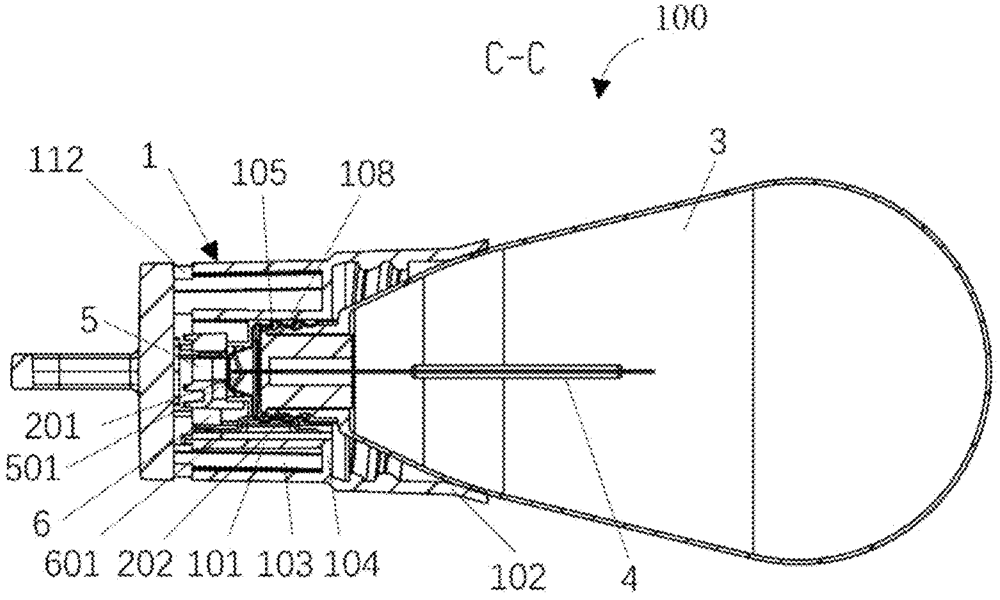
FIG. 10*b* is another sectional structure diagram of a fourth embodiment of the present application.

The specific structure and shape of the lamp tube 2 may be set according to actual requirements, for example, different structures shown in FIGS. 2*b* and 6, which are not limited herein.

In a fourth embodiment, as shown in FIGS. 9*a* to 10*b*, the difference between the fourth embodiment and the second embodiment lies in that: the lamp tube 2 is replaced with a filament 4. Specifically, a string lamp 100 includes a lamp holder 1, a filament 4 and a lampshade 3; the lamp holder 1 includes an inner shell portion 101 for connecting the lampshade 3 and an outer shell portion 102 for connecting the lampshade 3; a first region 103 between the inner shell portion 101 and the outer shell portion 102 is provided with a connection structure 104 covering the first region 103 along a circumferential direction of the inner shell portion 101; and the connection structure 104, the inner shell portion 101 and the outer shell portion 102 are integrally formed.

A first threaded hole 105 is provided on a side of the inner shell portion 101 facing the lampshade 3, a second thread 108 is provided on a side of the lampshade 3 facing the first threaded hole 105, the lampshade 3 is connected to the first threaded hole 105 through the second thread 108, and the filament 4 is fixed to the lampshade 3.

It can be seen from the described situations that, by means of the described structural design, the lamp tube 2 is replaced with the filament 4, thereby being adapted to the requirements of various scenes and improving the use flexibility of the string lamp 100.

In a fifth embodiment, as shown in FIGS. 1 to 10*b*, the difference between the fifth embodiment and the first embodiment lies in that: a first positive electrode portion 201 and a first negative electrode portion 202 are provided on the lamp tube 2, a first opening 5 is provided on a side of the inner shell portion 101 facing the first positive electrode portion 201, a second opening 6 is provided on a side of the inner shell portion 101 facing the first negative electrode portion 202, a first metal member 501 is provided within the first opening 5, a second metal member 601 is provided within the second opening 6, the first metal member 501 extends from the first opening 5 to the first positive electrode portion 201 and is electrically connected to the first positive electrode portion 201, and the second metal member 601 extends from the second opening 6 to the first negative electrode portion 202 and is electrically connected to the first negative electrode portion 202.

It can be seen from the described situations that, by means of the described structural design, as the first metal member 501 extends from the first opening 5 to the first positive electrode portion 201 and is electrically connected to the first positive electrode portion 201, and the second metal member 601 extends from the second opening 6 to the first negative electrode portion 202 and is electrically connected to the first negative electrode portion 202, thereby achieving the energizing of the string lamp.

In a sixth embodiment, as shown in FIGS. 1 to 10*b*, the difference between the sixth embodiment and the second embodiment lies in that: a first positive electrode portion 201 and a first negative electrode portion 202 are provided on the lamp tube 2, a second positive electrode portion 301 and a second negative electrode portion 302 are provided on the lampshade 3, the first positive electrode portion 201 is electrically connected to the second positive electrode portion 301, the first negative electrode portion 202 is electrically connected to the second negative electrode portion 302, a first opening 5 is provided on a side of the inner shell portion 101 facing the second positive electrode portion 301, a second opening 6 is provided on a side of the inner shell portion 101 facing the second negative electrode portion 302, a first metal member 501 is provided within the first opening 5, a second metal member 601 is provided within the second opening 6, the first metal member 501 extends from the first opening 5 to the second positive electrode portion 301 and is electrically connected to the second positive electrode portion 301, and the second metal member 601 extends from the second opening 6 to the second negative electrode portion 302 and is electrically connected to the second negative electrode portion 302.

The specific material of the first metal portion 501 and the second metal portion 601 may be set according to actual requirements, which is not limited herein.

It can be seen from the described situations that, by means of the described structural design, the lamp tube 2 is fixed to the lampshade 3, a first positive electrode portion 201 is electrically connected to a second positive electrode portion 301, and a first negative electrode portion 202 is electrically connected to a second negative electrode portion 302, a first metal member 501 extends from the first opening 5 to the second positive electrode portion 301 and is electrically connect to the second positive electrode portion 301, and a second metal member 601 extends from the second opening 6 to the second negative electrode portion 302 and is electrically connected to the second negative electrode portion 302, thereby achieving the energizing of the lamp tube 2 through the lampshade 3, achieving the energizing of the lampshade 3 through the first metal member 501 and the second metal member 601, and achieving the energizing of the string lamp 100.

In a seventh embodiment, as shown in FIGS. 1 to 10*b*, the difference between the seventh embodiment and the first embodiment lies in that: a third opening 7 is provided on a side of the inner shell portion 101 facing the lamp tube 2, the lamp holder 1 further comprises a top cover 109, a hook-shaped portion 110 is provided on a side of the top cover 109 facing the third opening 7, a protruding portion 111 is provided on a side of the third opening 7 facing the hook-shaped portion 110, and the hook-shaped portion 110 is selectively hooked at the protruding portion 111.

It can be seen from the described situations that, by means of the described structural design, the top cover 109 of the lamp holder 1 can be selectively hooked at the protruding portion 111 through the hook-shaped portion 110, thereby achieving the flexible mounting of the top cover 109.

The structure of the lamp tube 2 is fixed to the lampshade 3, a third opening 7 is provided with a side of the inner shell portion 101 facing the lamp tube 3, a hook-shaped portion 110 is provided with a side of the top cover 109 facing the third opening 7, a protruding portion 111 is provided with a side of the third opening 7 facing the hook-shaped portion 110, and the hook-shaped portion 110 is selectively hooked at the protruding portion 111.

Optionally, there are two third openings 7 and two hook-shaped portions 110. The number of the third opening 7 and the hook-shaped portion 110 may be set according to practical requirements, which is not limited herein.

In an eighth embodiment, as shown in FIGS. 1 and 6, a string lamp 100 comprises a lamp holder 1, a lamp tube 2 and a lampshade 3; the lamp holder 1 comprises an inner shell portion 101 for connecting the lamp tube 2 and an outer shell portion 102 for connecting the lampshade 3; a first region 103 is provided between the inner shell portion 101 and the outer shell portion 102; the first region 103 is filled and closed by a connection structure 104; and the connection structure 104, the inner shell portion 101 and the outer shell portion 102 are integrally formed.

Optionally, the first region 103 is a solid structure, thereby improving the stability of the overall structure of the string lamp 100.

Specifically, a first threaded hole 105 is provided on a side of the inner shell portion 101 facing the lamp tube 2, a first thread 106 is provided on a side of the lamp tube 2 facing the first threaded hole 105, and the lamp tube 2 is connected to the first threaded hole 105 through the first thread 106.

Specifically, a second threaded hole 107 is provided on a side of the outer shell portion 102 facing the lampshade 3, the second threaded hole 107 is located on a side of the connection structure 104 facing the lampshade 3, a second thread 108 is provided on a side of the lampshade 3 facing the second threaded hole 107, and the lampshade is connected to the second threaded hole 107 through the second thread 108.

In practical application, the first region 103 may be a hollow structure as shown in the first embodiment, may also be a solid structure as shown in the eighth embodiment, or other structures, and may be specifically set according to practical requirements, which is not limited herein.

It can be seen from the described situations that, by means of the described structural design, a first region 103 between the inner shell portion 101 and the outer shell portion 102 of the lamp holder 1 of the string lamp 100 of the first embodiment is provided with a connection structure 104; and the connection structure 104, the inner shell portion 101 and the outer shell portion 102 are integrally formed, thereby reducing the difficulty of a manufacturing process, being convenient and quick to mount, having low manufacturing costs, and improving the production efficiency. In addition, as the first region 103 is filled and closed by a connection structure 104, thereby enhancing the stability of the connection between the inner shell portion 101 and the outer shell portion 102 and the stability of the overall structure of the string lamp 100.

It should be noted that the structures of the second embodiment to the seventh embodiment can be applied to the eighth embodiment, and the only difference from the first embodiment is that the first region 103 is a solid structure.

Figure 11:
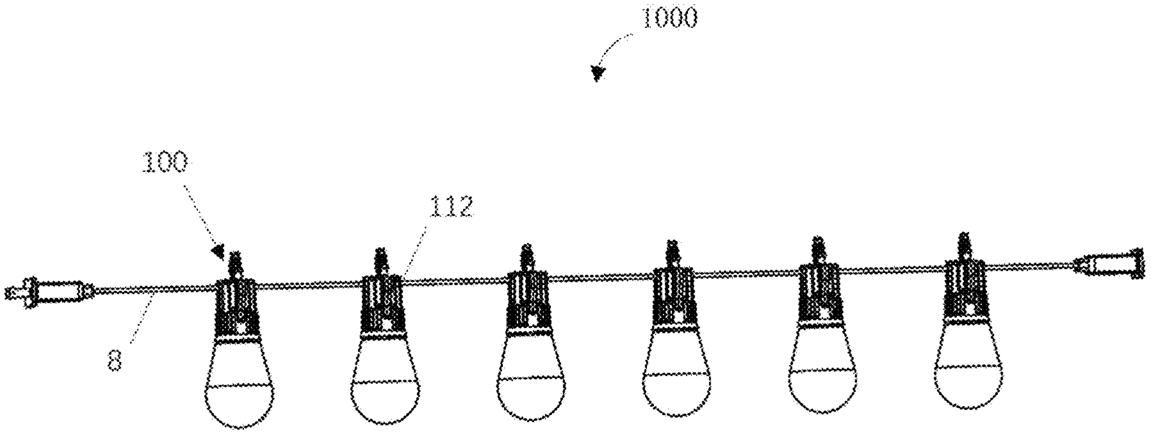
FIG. 11 is a structure diagram of a ninth embodiment and a tenth embodiment of the present application.

In a ninth embodiment, as shown in FIG. 11, a string lamp structure 1000 includes a string lamp 100; the string lamp 100 includes a lamp holder 1, a lamp tube 2 and a lampshade 3; the lamp holder 1 includes an inner shell portion 101 for connecting the lamp tube 2 and an outer shell portion 102 for connecting the lampshade 3; a first region 103 between the inner shell portion 101 and the outer shell portion 102 is provided with a connection structure 104 covering the first region 103 along a circumferential direction of the inner shell portion 101; and the connection structure 104, the inner shell portion 101 and the outer shell portion 102 are integrally formed. The lamp holder 1 is provided with a power line passage 112 through which a string lamp power line 8 passes. The string lamp power line 8 can also be called a power supply line, and the power line passage 112 can also be called an electric wire passage.

Further, the string lamps 100 are sequentially mounted on the string lamp power line 8, and the string lamps 100 are electrically connected to the string lamp power line 8 respectively.

By means of the above structural design, the present application has the advantages of novel structural design, high adaptability and high hanging stability and reliability.

In a tenth embodiment, as shown in FIG. 11, a string lamp structure 1000 includes a string lamp 100; the string lamp 100 includes a lamp holder 1, a lamp tube 2 and a lampshade 3; the lamp holder 1 includes an inner shell portion 101 for connecting the lamp tube 2 and an outer shell portion 102 for connecting the lampshade 3; a first region 103 is provided between the inner shell portion 101 and the outer shell portion 102; the first region 103 is filled and closed by a connection structure 104; and the connection structure 104, the inner shell portion 101 and the outer shell portion 102 are integrally formed. The lamp holder 1 is provided with a power line passage 112 through which a string lamp power line 8 passes. The string lamp power line 8 can also be called a power supply line, and the power line passage 112 can also be called an electric wire passage.

Further, the string lamps 100 are sequentially mounted on the string lamp power line 8, and the string lamps 100 are electrically connected to the string lamp power line 8 respectively.

By means of the above structural design, the present application has the advantages of novel structural design, high adaptability and high hanging stability and reliability.

The above content is merely preferred embodiments of the present application. For those of ordinary skill in the art, on the basis of the ideas of the present application, the particular embodiments and the application scope will be changed. The content of the specification should not be construed as limitations on the present application.

What is claimed is:

1. A string lamp, comprising a lamp holder, a lamp tube and a lampshade, wherein the lamp holder comprises an inner shell portion for connecting the lamp tube and an outer shell portion for connecting the lampshade; a first region between the inner shell portion and the outer shell portion is provided with a connection structure covering the first region along a circumferential direction of the inner shell portion; and the connection structure, the inner shell portion and the outer shell portion are integrally formed;

wherein a first positive electrode portion and a first negative electrode portion are provided on the lamp tube, a first opening is provided on a side of the inner shell portion facing the first positive electrode portion, a second opening is provided on a side of the inner shell portion facing the first negative electrode portion, a first metal member is provided within the first opening, a second metal member is provided within the second opening, the first metal member extends from the first opening to the first positive electrode portion and is electrically connected to the first positive electrode portion, and the second metal member extends from the second opening to the first negative electrode portion and is electrically connected to the first negative electrode portion.

2. The string lamp according to claim 1, wherein a first threaded hole is provided on a side of the inner shell portion facing the lamp tube, a first thread is provided on a side of the lamp tube facing the first threaded hole, and the lamp tube is connected to the first threaded hole through the first thread.

3. The string lamp according to claim 2, wherein a second threaded hole is provided on a side of the outer shell portion facing the lampshade, the second threaded hole is located on a side of the connection structure facing the lampshade, a second thread is provided on a side of the lampshade facing the second threaded hole, and the lampshade is connected to the second threaded hole through the second thread.

4. The string lamp according to claim 1, wherein a first threaded hole is provided on a side of the inner shell portion facing the lampshade, a second thread is provided on a side of the lampshade facing the first threaded hole, the lampshade is connected to the first threaded hole through the second thread, and the lamp tube is fixed to the lampshade.

5. The string lamp according to claim 1, wherein a third opening is provided on a side of the inner shell portion facing the lamp tube, the lamp holder further comprises a top cover, a hook-shaped portion is provided on a side of the top cover facing the third opening, a protruding portion is provided on a side of the third opening facing the hook-shaped portion, and the hook-shaped portion is selectively hooked at the protruding portion.

6. The string lamp according to claim 5, wherein there are two third openings and two hook-shaped portions.

7. The string lamp according to claim 1, wherein the first region is a cavity.

8. The string lamp according to claim 1, wherein the connection structure is an annular plate.

9. A string lamp structure, comprising at least one string lamp according to claim 1, wherein the lamp holder is provided with a power line passage for a string lamp power line to pass through.

10. A string lamp, comprising a lamp holder, a lamp tube and a lampshade, wherein the lamp holder comprises an inner shell portion for connecting the lamp tube and an outer shell portion for connecting the lampshade; a first region is provided between the inner shell portion and the outer shell portion; the first region is filled and closed by a connection structure; and the connection structure, the inner shell portion and the outer shell portion are integrally formed;

wherein a first positive electrode portion and a first negative electrode portion are provided on the lamp tube, a first opening is provided on a side of the inner shell portion facing the first positive electrode portion, a second opening is provided on a side of the inner shell portion facing the first negative electrode portion, a first metal member is provided within the first opening, a second metal member is provided within the second opening, the first metal member extends from the first opening to the first positive electrode portion and is electrically connected to the first positive electrode portion, and the second metal member extends from the second opening to the first negative electrode portion and is electrically connected to the first negative electrode portion.

11. The string lamp according to claim 10, wherein a first threaded hole is provided on a side of the inner shell portion facing the lamp tube, a first thread is provided on a side of the lamp tube facing the first threaded hole, and the lamp tube is connected to the first threaded hole through the first thread.

12. The string lamp according to claim 11, wherein a second threaded hole is provided on a side of the outer shell portion facing the lampshade, the second threaded hole is located on a side of the connection structure facing the lampshade, a second thread is provided on a side of the lampshade facing the second threaded hole, and the lampshade is connected to the second threaded hole through the second thread.

13. The string lamp according to claim 10, wherein a first threaded hole is provided on a side of the inner shell portion facing the lampshade, a second thread is provided on a side of the lampshade facing the first threaded hole, the lampshade is connected to the first threaded hole through the second thread, and the lamp tube is fixed to the lampshade.

14. The string lamp according to claim 10, wherein a third opening is provided on a side of the inner shell portion facing the lamp tube, the lamp holder further comprises a top cover, a hook-shaped portion is provided on a side of the top cover facing the third opening, a protruding portion is provided on a side of the third opening facing the hook-shaped portion, and the hook-shaped portion is selectively hooked at the protruding portion.

15. The string lamp according to claim 10, wherein there are two third openings and two hook-shaped portions.

16. The string lamp according to claim 10, wherein the first region is a cavity.

17. A string lamp structure, comprising at least one string lamp according to claim 10, wherein the lamp holder is provided with a power line passage for a string lamp power line to pass through.

* * * * *